United States Patent
Rana

(10) Patent No.: US 11,887,017 B2
(45) Date of Patent: Jan. 30, 2024

(54) AUTOMATICALLY PREDICTING TRANSACTION LIKELIHOOD INFORMATION AND TRANSACTION-RELATED TEMPORAL INFORMATION USING MACHINE LEARNING TECHNIQUES

(71) Applicant: Dell Products L.P., Round Rock, TX (US)

(72) Inventor: Shivangi Rana, New Delhi (IN)

(73) Assignee: Dell Products L.P., Round Rock, TX (US)

( * ) Notice: Subject to any disclaimer, the term of this patent is extended or adjusted under 35 U.S.C. 154(b) by 434 days.

(21) Appl. No.: 17/213,989

(22) Filed: Mar. 26, 2021

(65) Prior Publication Data
US 2022/0309363 A1 Sep. 29, 2022

(51) Int. Cl.
*G06Q 30/00* (2023.01)
*G06N 5/04* (2023.01)
(Continued)

(52) U.S. Cl.
CPC .............. *G06N 5/04* (2013.01); *G06N 20/00* (2019.01); *G06Q 10/087* (2013.01); *G06Q 30/0202* (2013.01)

(58) Field of Classification Search
CPC .............. G06Q 30/024; G06Q 10/087; G06Q 30/0202; G06N 5/04; G06N 20/00
See application file for complete search history.

(56) References Cited

U.S. PATENT DOCUMENTS 8,024,219 B2   9/2011   Woehler
8,027,860 B2   9/2011   John
(Continued)

OTHER PUBLICATIONS

Patrick, K., Supply Chain Dive, ThinkSCM Launches Analytics Tool to Forecast Customer Demand, Oct. 19, 2017.
(Continued)

*Primary Examiner* — Alvin L Brown
(74) *Attorney, Agent, or Firm* — Ryan, Mason & Lewis, LLP

(57) ABSTRACT

Methods, apparatus, and processor-readable storage media for automatically predicting transaction likelihood information and transaction-related temporal information using machine learning techniques are provided herein. An example computer-implemented method includes obtaining historical data pertaining to completed transactions within an enterprise system; determining, for at least one of the completed transactions, a set of multiple transaction-related features by processing at least a portion of the obtained historical data; training at least one machine learning model using at least a portion of the set of multiple determined transaction-related features; predicting transaction likelihood information and transaction-related temporal information associated with input data attributed to at least one pending transaction within the enterprise system by processing at least a portion of the input data using the at least one machine learning model; and performing one or more automated actions based on one or more of the predicted transaction likelihood information and the predicted transaction-related temporal information.

20 Claims, 8 Drawing Sheets

(51) Int. Cl.
  *G06Q 30/0202* (2023.01)
  *G06Q 10/087* (2023.01)
  *G06N 20/00* (2019.01)

(56) References Cited

U.S. PATENT DOCUMENTS

| | | | |
|---|---|---|---|
| 8,050,957 | B2 | 11/2011 | Woehler |
| 8,050,958 | B2 | 11/2011 | Woehler |
| 8,200,521 | B2 | 6/2012 | Hader |
| 8,468,544 | B1 | 6/2013 | Becket et al. |
| 8,799,061 | B1 | 8/2014 | Chatterjee et al. |
| 10,713,706 | B1 | 7/2020 | Thankachan et al. |
| 2004/0015461 | A1 | 1/2004 | Lo |
| 2011/0119210 | A1 | 5/2011 | Zhang et al. |
| 2011/0289090 | A1 | 11/2011 | Zhou et al. |
| 2014/0201126 | A1 | 7/2014 | Zadeh et al. |
| 2016/0092803 | A1 | 3/2016 | Boyacigiller et al. |
| 2016/0378771 | A1 | 12/2016 | Tholiya et al. |
| 2017/0330123 | A1 | 11/2017 | Deshpande et al. |
| 2018/0025407 | A1 | 1/2018 | Zhang et al. |
| 2018/0096372 | A1* | 4/2018 | Rickard, Jr. ....... G06Q 30/0201 |
| 2018/0121829 | A1 | 5/2018 | Chowdhary et al. |
| 2018/0204111 | A1 | 7/2018 | Zadeh et al. |
| 2018/0365441 | A1 | 12/2018 | Guttmann |
| 2019/0243691 | A1 | 8/2019 | LaBute et al. |
| 2021/0117995 | A1* | 4/2021 | Kansara ............. G06Q 30/0202 |
| 2021/0303783 | A1* | 9/2021 | Misra ................. G06F 16/9024 |

OTHER PUBLICATIONS

Ning Lu, A Machine Learning Approach to Automated Trading, Boston College Computer Science Senior Thesis, May 9, 2016. https://www.bc.edu/content/dam/files/schools/cas_sites/cs/pdf/academics/honors/16Lu.pdf.

* cited by examiner

| BASE CONFIDENCE LEVEL | TARGET CONFIDENCE LEVEL | BASE DEAL CLOSE DATE | TARGET DEAL CLOSE DATE | BASE LAST MODIFIED DATE | TARGET LAST MODIFIED DATE | POSITIVE TRANSITIONS | NEGATIVE TRANSITIONS | DWELL TIME | CLOSE DELTA | JOURNEY WEIGHT |
|---|---|---|---|---|---|---|---|---|---|---|
| 30% | 10% | 10-JAN-2019 | 1-FEB-2019 | 25-SEP-2018 | 1-NOV-2018 | 0 | 0 | 37 | 22 | 30 |
| 10% | 60% | 1-FEB-2019 | 10-JAN-2019 | 1-NOV-2018 | 21-NOV-2018 | 0 | 1 | 20 | -22 | 7 |
| 60% | 90% | 10-JAN-2019 | 27-DEC-2018 | 21-NOV-2018 | 13-DEC-2018 | 1 | 1 | 22 | -14 | 36 |
| 90% | 100% | 27-DEC-2018 | 31-DEC-2018 | 13-DEC-2018 | 31-DEC-2018 | 2 | 1 | 18 | 4 | 47 |

AUTOMATICALLY PREDICTING TRANSACTION LIKELIHOOD INFORMATION AND TRANSACTION-RELATED TEMPORAL INFORMATION USING MACHINE LEARNING TECHNIQUES

FIELD

The field relates generally to information processing systems, and more particularly to techniques for managing orders using such systems.

BACKGROUND

Large orders can often drive revenues across different enterprises as well as different business units within such enterprises. However, large orders are commonly less predictable than smaller orders and can introduce supply chain challenges, and information pertaining to such challenges is frequently not available in a timely fashion to sales representatives and/or other entities carrying out the obtainment and/or execution of orders. Consequently, conventional order management approaches can result in incorrect demand views, extended lead times for delivery, abdication of orders to competitors, wasting unsold inventory, etc.

SUMMARY

Illustrative embodiments of the disclosure provide techniques for automatically predicting transaction likelihood information and transaction-related temporal information using machine learning techniques. An exemplary computer-implemented method includes obtaining historical data pertaining to one or more completed transactions within at least one enterprise system, and determining, for at least one of the one or more completed transactions, a set of multiple transaction-related features by processing at least a portion of the obtained historical data. The method also includes training at least one machine learning model using at least a portion of the set of multiple determined transaction-related features, and predicting transaction likelihood information and transaction-related temporal information associated with input data attributed to at least one pending transaction within the at least one enterprise system by processing at least a portion of the input data using the at least one machine learning model. Further, the method includes performing one or more automated actions based at least in part on one or more of the predicted transaction likelihood information and the predicted transaction-related temporal information.

Illustrative embodiments can provide significant advantages relative to conventional order management approaches. For example, problems associated with incorrect demand views and forecast errors are overcome in one or more embodiments through automatically predicting transaction likelihood information and transaction-related temporal information using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 4 shows a table of base training examples for one complete transaction journey in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
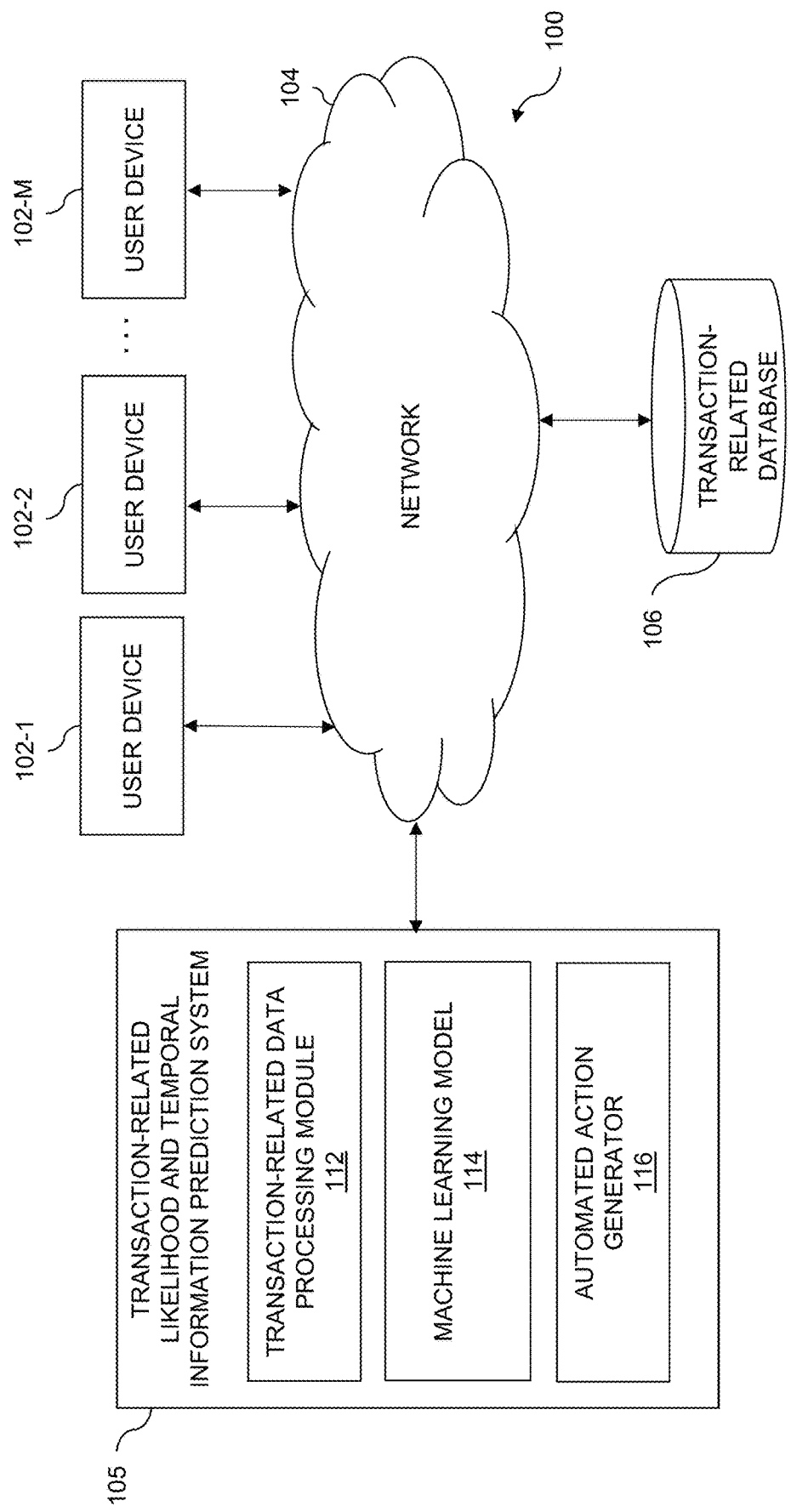
FIG. 1 shows an information processing system configured for automatically predicting transaction likelihood information and transaction-related temporal information using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is transaction-related likelihood and temporal information prediction system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, transaction-related likelihood and temporal information prediction system 105 can have an associated database 106 configured to store data pertaining to potential transactions and/or deals currently not closed or cancelled, along with details related thereto, which comprise, for example, user-specific information and/or customer-specific information, enterprise-specific information, product-specific information and/or service-specific information, etc.

The database 106 in the present embodiment is implemented using one or more storage systems associated with transaction-related likelihood and temporal information prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with transaction-related likelihood and temporal information prediction system 105 are one or more input-output devices, which illustratively comprise keyboards, displays or other types of input-output devices in any combination. Such input-output devices can be used, for example, to support one or more user interfaces to transaction-related likelihood and temporal information prediction system 105, as well as to support communication between transaction-related likelihood and temporal information prediction system 105 and other related systems and devices not explicitly shown.

Additionally, transaction-related likelihood and temporal information prediction system 105 in the FIG. 1 embodiment is assumed to be implemented using at least one processing device. Each such processing device generally comprises at least one processor and an associated memory, and implements one or more functional modules for controlling certain features of transaction-related likelihood and temporal information prediction system 105.

More particularly, transaction-related likelihood and temporal information prediction system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows transaction-related likelihood and temporal information prediction system 105 to communicate over the network 104 with the user devices 102, and illustratively comprises one or more conventional transceivers.

The transaction-related likelihood and temporal information prediction system 105 further comprises transaction-related data processing module 112, machine learning model 114, and automated action generator 116.

It is to be appreciated that this particular arrangement of elements 112, 114 and 116 illustrated in transaction-related likelihood and temporal information prediction system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically predicting transaction likelihood information and transaction-related temporal information using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, transaction-related likelihood and temporal information prediction system 105 and transaction-related database 106 can be on and/or part of the same processing platform.

An exemplary process utilizing elements 112, 114 and 116 of an example transaction-related likelihood and temporal information prediction system 105 in computer network 100 will be described in more detail with reference to the flow diagram of FIG. 6.

Accordingly, at least one embodiment includes automatically predicting transaction likelihood information and transaction-related temporal information using machine learning techniques. By way of illustration, consider an example use case scenario wherein a sales representative enters transaction information in a customer relationship management (CRM) tool. A particular transaction can include multiple opportunities, each pertaining to a unique product line, and the CRM tool can provide an option to assign a confidence level for the transaction comprised of a discrete percentage value. Using conventional approaches, the confidence level thus assigned is subjective to the sales representative handling the transaction. Similarly, in conventional approach contexts, the sales representative can also assign a manually estimated date for the download and/or closure of the transaction (also referred to as the target close date), which is also subjective to sales representative.

However, as noted herein, such conventional processes, reliant on subjective and manual human estimates, are prone to errors, delays, and resource wastage. In contrast, and as further detailed herein, one or more embodiments include providing automated capabilities to take any open transaction and/or opportunity as it stands, and generate, for any arbitrary point in time in the future (e.g., weekly steps), a then-expected status of that transaction and/or opportunity, along with a confidence and/or probability score associated therewith. By way merely of illustration, consider a query such as, for example, "Would an opportunity, comprising Product 'a' for a customer 'X', be converted to an order by 'Y' date, and if not, what will be the status (confidence level) of the deal, on that date?" An example embodiment can include, in response to such a query, automatically generating a response and/or report that includes outputs of (i) a next expected confidence interval level (e.g., 100% confidence, indicating that it is predicted that the opportunity will be won), (ii) an estimated close and/or download date (e.g., by fiscal week FY21W50), and (iii) a close and/or download probability (e.g., 84.56%).

Accordingly, as described herein, at least one embodiment includes producing and/or providing a framework capable of generating, for any open transaction and/or opportunity (also referred to herein as a deal), predictions and/or quantifications including an expected confidence level pertaining to the overall status of the deal (e.g., 0%, indicative of the deal being likely to be lost and/or cancelled; 10%, indicative of the deal being merely in a discovery phase; 30%, indicative of the deal being in a qualification phase; 60%, indicative of the deal being a candidate for proposal; 90%, indicative of the deal being likely to reach a commitment phase; and 100%, indicative of the deal being won), temporal information associated with the status and/or predicted outcome of the transaction and/or opportunity (e.g., a date of a particular status change, etc.), and the likelihood that the transaction and/or opportunity is converted to an order (also referred to herein as the download probability) within a given period of time.

As also detailed herein, such an embodiment includes using one or more machine learning classification algorithms to predict not only a win or loss for a deal, but also one or more status changes in confidence levels across the lifetime of the deal (ultimately concluding in either an order (Won—100%) or the deal being abandoned (Lost/Cancelled—0%). Additionally or alternatively, such an embodiment can include using one or more machine learning classification algorithms to provide a status prediction for any point and/or date in the future, thus allowing for, e.g., a week on week prognosis for x weeks from the current date, for every open opportunity.

Data processed and/or utilized by such a machine learning classification algorithm can include CRM tool opportunity-level data such as, for example, customer-specific and deal-specific information (e.g., revenue information, line of business (LOB), time since last order, customer repeat rate, etc.), as well as data pertaining to the journey of one or more related opportunities (e.g. the last modification date of the deal, the deal stage name, current confidence tier associated with the deal, the estimated date for closure of the deal, age and history of past updates and modifications made (along with counts of negative and positive transitions) to both the deal stage (confidence level) and the time estimates (deal close date) at each update, etc.). Therefore, each time a deal is modified and/or updated, a new entry can be created and/or utilized, wherein the new entry comprises the updated history and modified deal-specific information, if any.

Also, as detailed herein, one or more embodiments include determining and/or generating, for each transaction and/or opportunity, data features including dwell time, close delta, and journey weight. Dwell time refers to the time duration between two updates (e.g., the time delta from the last modified date). Such a determination, in conjunction with the current deal history and one or more previous updates, is used by the machine learning algorithm(s) in at least one embodiment to learn from past trends and to learn how the deal statuses and/or confidence levels have been modified over time (e.g., by the sales representative(s)).

At any specific point in time, customer-specific and deal-specific information is likely to remain mostly static. The dwell time, however, is liable to change each time an update is made. Accordingly, making such a (dwell time) determination enables one or more machine learning algorithm(s) used in at least one embodiment to learn how deals vary over time with updates in terms of confidence levels and estimated deal close dates, as well as learn one or more variation sequences and/or patterns across the lifetime of such deals. Accordingly, in accordance with one or more embodiments, the machine learning algorithm(s) learn(s) from data associated with the difference between any two given updates (to a transaction and/or opportunity with respect to the time elapsed and the deal history up until that point in time).

Also, in at least one embodiment, in order to accurately determine a probable status at any arbitrary time in the future, the dwell time can include a provision to account for stagnancy (i.e., the time period for which there are no updates to the opportunity in the CRM tool). Such a determination can be achieved, for example, by considering the entire timespan between two updates to be a period of stagnancy, which is, in turn, also fed to the machine learning algorithm(s) while training.

In one or more embodiments, close delta is a feature that is related to dwell time. As noted herein, each time a deal is updated, one or more factors, such as the confidence level and/or the estimated date for the closure, can be modified by, for example, a sales representative. While dwell time, as detailed above, pertains to the time gap between updates and/or modifications, the close delta pertains to the time gap between a new estimated date for closure and the previous estimated data for closure.

Accordingly, in at least one embodiment, the close delta and the dwell time are complimentary and used to capture at least one aspect of each deal including, for example, how does each update and/or transition (positive or negative) correlate to the change in estimated time for closure, with respect to the actual closure date of a deal (e.g., a drop in confidence can be accompanied by an increment in the expected close date). Like dwell time, the close delta can also account for stagnancy in one or more embodiments by considering its value to be zero for any period of stagnancy defined by the dwell time (e.g., because the expected close date is likely to remain constant so long as the current confidence level remains constant).

Also, one or more embodiments include considering how the journey of a single deal is modelled mathematically instead of a chain of categorical features, which can vary in number for each deal. For example, a deal can vacillate between different confidence levels with every update (both positive and negative transitions). Such an embodiment includes creating a feature referred to herein as journey weight, which serves to give a logical definition to each journey through a single numerical value. In one or more embodiments, journey weight is defined as follows. First, the polarity of each successive change is calculated (i.e., positive or negative, as +1 or −1 respectively). Second, the squares of the successive differences are calculated. Third, a penalty factor is calculated which penalizes certain transitions. This can be defined, for example, as a Boolean algebraic equation. By way of example, a penalty factor, when translated to articulated rules, can include the following: no negative transitions are penalized, all positive transitions preceded by a negative transition are penalized, and all positive transitions succeeded by a negative transition are penalized. Numerically, the penalty factor is tunable (e.g., set at 0.5 as a default), wherever the transition meets any of the above requirements. Finally, in at least one embodiment, the square root of the sum-of-products of the above three values (i.e., the polarity of each successive change, the squares of the successive differences, and the penalty factor), is calculated to provide the journey weight.

Such a definition of journey weight ensures, for example, that deals with a higher outright confidence are scored higher, while deals with negative dips are sufficiently penalized. This inherently incorporates the length of the journey; i.e., journeys with a larger number of steps between the same initial (0) and the final (current) status are penalized more than those with fewer steps. By way of further example, consider the following table:

| Index | Journey | Journey Weight |
|---|---|---|
| 1 | 0–>90 | 90 |
| 2 | 0–>30–>90 | 67 |
| 3 | 0–>60–>90 | 67 |
| 4 | 0–>30–>60–>90 | 52 |
| 5 | 0–>60–>30–>60–>90 | 47 |
| 6 | 0–>60–>30–>90 | 52 |
| 7 | 0–>30–>60–>30–>90 | 47 |
| 8 | 0–>90–>30–>60–>90 | 42 |
| 9 | 0–>30–>60 | 42 |
| 10 | 0–>60–>30–>60 | 37 |

It is to be noted that the journey weight feature, in one or more embodiments, does not take time into consideration, and only pertains to the nature of the deal journey. The nature of the deal journey can heed, for example, explicit and implicit factors such as, for example, the polarity and magnitudes of the journey steps, the number of journey steps from start to finish, etc. Accordingly, certain different journeys can have the same journey weight value. These journeys, however, are deemed similar in their definition if the factor of time is ignored (which is already handled through different features such as deal age, frequency of updates, etc.). This can be illustrated, for example, by a comparative evaluation of the examples in the table above.

Comparing index (2) and index (3) in the above table, for example, both entries have the same journey weight value of 67. Because both provide a complete transition to 90% with only two intermediary steps (ignoring the time between those transitions), a similar (or identical, as here) journey weight makes logical sense, considering both also have similar drastic jumps of 60% (between 30% and 90%, and, 0% and 60%, respectively).

Comparing index (4) and index (5) in the above table, for example, a constant upward trend to 90% is observed in index (4), and therefore a journey weight value of 52. For index (5), however, due to the dip from 60% to 30% in the middle of the journey, the weight is aptly penalized to give a value of 47. By way of further example, comparing index (4), index (5) and index (6), the drastic nature of the change from 30% to 90% is observed with fewer steps in index (4) and index (6), elevating those corresponding journey weight values.

Additionally, for example, index (8) exemplifies how a fickle deal is penalized, as the journey includes a sudden drops from 90% to 30%, before gradually rising to 90%. Such a journey, as noted in the table, yields a comparatively low journey weight value of 42.

In at least one embodiment, multiple features (e.g., the features detailed above as well as additional features such as deal age, repeat rate, etc.) are calculated for each deal update. As noted herein, in such an embodiment, the same deals, at different junctures of update, are independently logged, and therefore considered as separate training examples. Additionally, such deals can include changes to deal-specific information (e.g., revenue amount, order quantity, etc.) as well as information pertaining to the past history of the deal (e.g., the entire update history, current age, etc.). Such data are fed (i.e., used to train) to at least one machine learning classifier and/or classification model (e.g., a tree-based gradient boosting framework such as CatBoost). In one or more embodiments, the target variable for such a model is the latest update (e.g., the new confidence level assigned to the latest update).

In at least one embodiment, once trained, the machine learning model operates on a collection of currently open deals in a CRM tool (e.g., every week) to produce at least one prediction (e.g., a temporally-based prediction such as an x-week status prediction, wherein x is tunable). The model processes deal-level data and calculates one or more synthesized features.

As noted herein, such a prediction can take the form, for example, of a response to a query such as "What will the status of the deal be on date Z?" In such an embodiment, the dwell time is calculated as the time-gap between the current date and the provided date (here, Z) to produce a prediction. For example, for the same deal, x different dates (with one-week successive lags) can be provided and the model can be run separately for each, thus producing separate predictions for the upcoming x weeks.

Additionally, in one or more embodiments, an output of the model, the time for the predicted modification and/or update, is also a feature due to its arbitrary nature. Accordingly, such an embodiment includes defining a premise such as, for example, a need for week-on-week predictions for the next x weeks. Thereafter, x separate inputs (each with a different dwell time value, with all other feature values remaining the same) are processed by the machine learning model, which produces x corresponding outputs.

Figure 2:
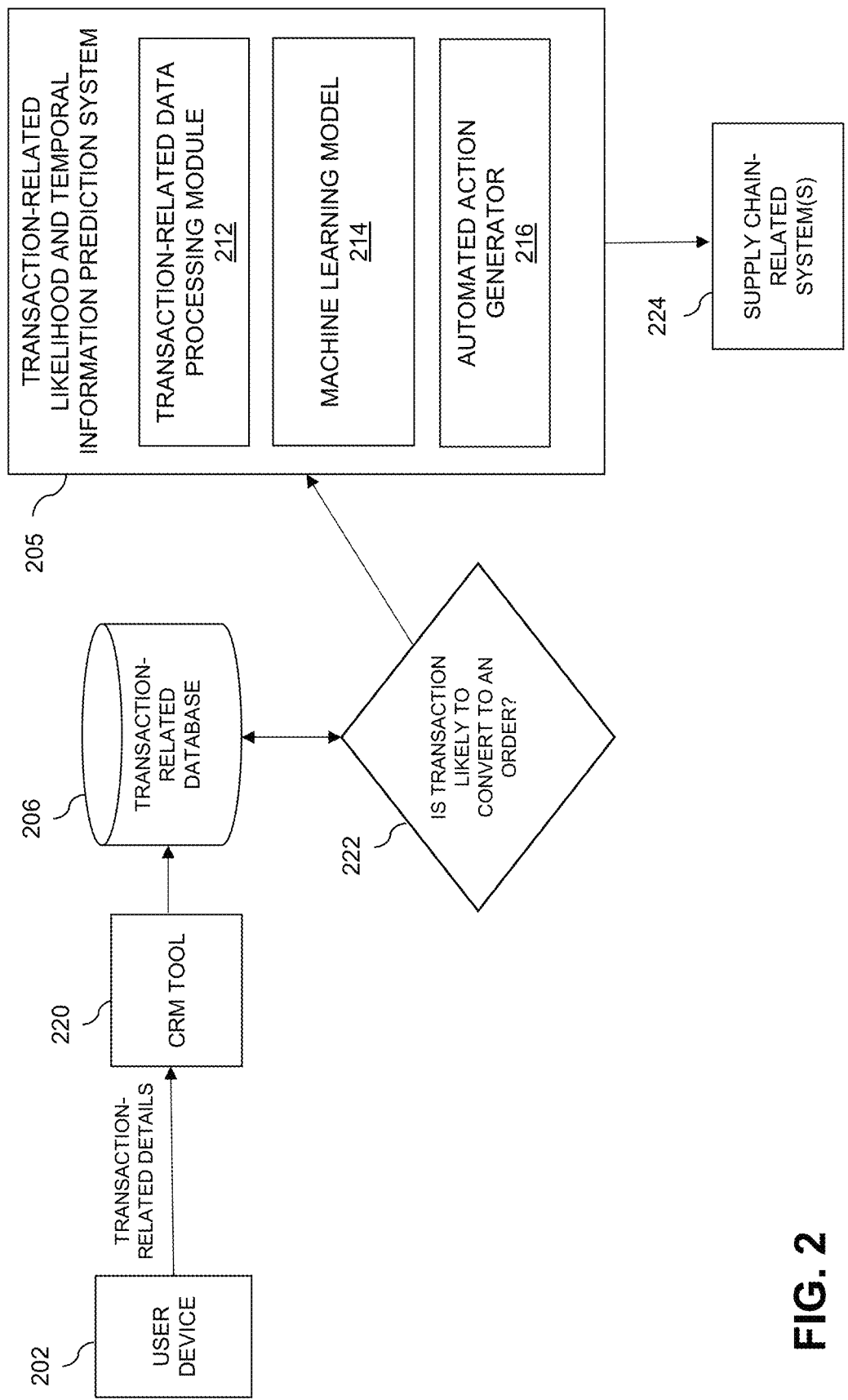
FIG. 2 shows an example workflow of at least a portion of an illustrative embodiment.

FIG. 2 shows an example workflow of at least a portion of an illustrative embodiment. By way of illustration, FIG. 2 depicts the workflow of an example process associated with one or more embodiments, starting at the juncture a sales representative creates a deal and/or opportunity in a CRM tool, and continuing until the potential fulfillment of that deal if the transaction gets converted. Accordingly, in such an example embodiment, the sales representative, via user device 202, engages with one or more relevant customers and determines the scope of the transaction requirements and generates transaction-related details to be input to CRM tool 220. CRM tool 220, as noted herein, processes and/or logs the input transaction-related details, which can include, e.g., customer-specific information and transaction-specific information, along with time and likelihood estimates for closure of the transaction. In conjunction with processing such information, CRM tool 220 also provides at least a portion of the processed information to transaction-related database 206 (also referred to herein as an open sales pipeline), which can maintain data pertaining to every deal that is currently not closed or cancelled, along with details related thereto.

In at least one embodiment, supply chain planners (not shown in FIG. 2) can engage with and/or process information from the transaction-related database 206, wherein the supply chain planners include personnel responsible for ensuring the consistent and/or effective functioning of at least one relevant supply chain (e.g., ensuring management of inventory and the balance between demand and supply).

As also depicted in FIG. 2, step 222 includes assessing whether a given transaction and/or opportunity is likely to convert to an order. This assessment can be carried out, at least in part, in one or more embodiments via transaction-related likelihood and temporal information prediction system 205 (including transaction-related data processing module 212, machine learning model 214, and automated action generator 216), which can, as detailed herein, generate insights and/or predictions pertaining to the expected prognoses of the open transactions along with accompanying time estimates. Based at least in part on the actions carried out by transaction-related likelihood and temporal information prediction system 205, one or more embodiments include identifying deals and/or transactions deemed likely to be closed and/or downloaded in the future (e.g., within a given or determined temporal period). Procurement and stocking is automatically initiated (e.g., via supply chain-related system(s) 224 in response to an automated instruction generated and sent from transaction-related likelihood and temporal information prediction system 205) for such deals and/or transactions to ensure fulfillment if and when the transaction closes. Additionally or alternatively, as noted above, supply chain planners (which can operate in association with supply chain-related system(s) 224) can initiate one or more intelligent decisions to further consistent and/or effective management of inventory and the balance between demand and supply.

Additionally or alternatively, based at least in part on the actions carried out by transaction-related likelihood and temporal information prediction system 205, at least one embodiment includes identifying deals and/or transactions deemed not likely to be closed and/or downloaded in the future (e.g., within a given or determined temporal period). Procurement and stocking is automatically deferred or precluded for such deals and/or transactions, and one or more additional automated actions can be taken by transaction-related likelihood and temporal information prediction system 205 to ensure that supply chain resources are not needlessly utilized in connection with such deals and/or transactions.

Figure 3:
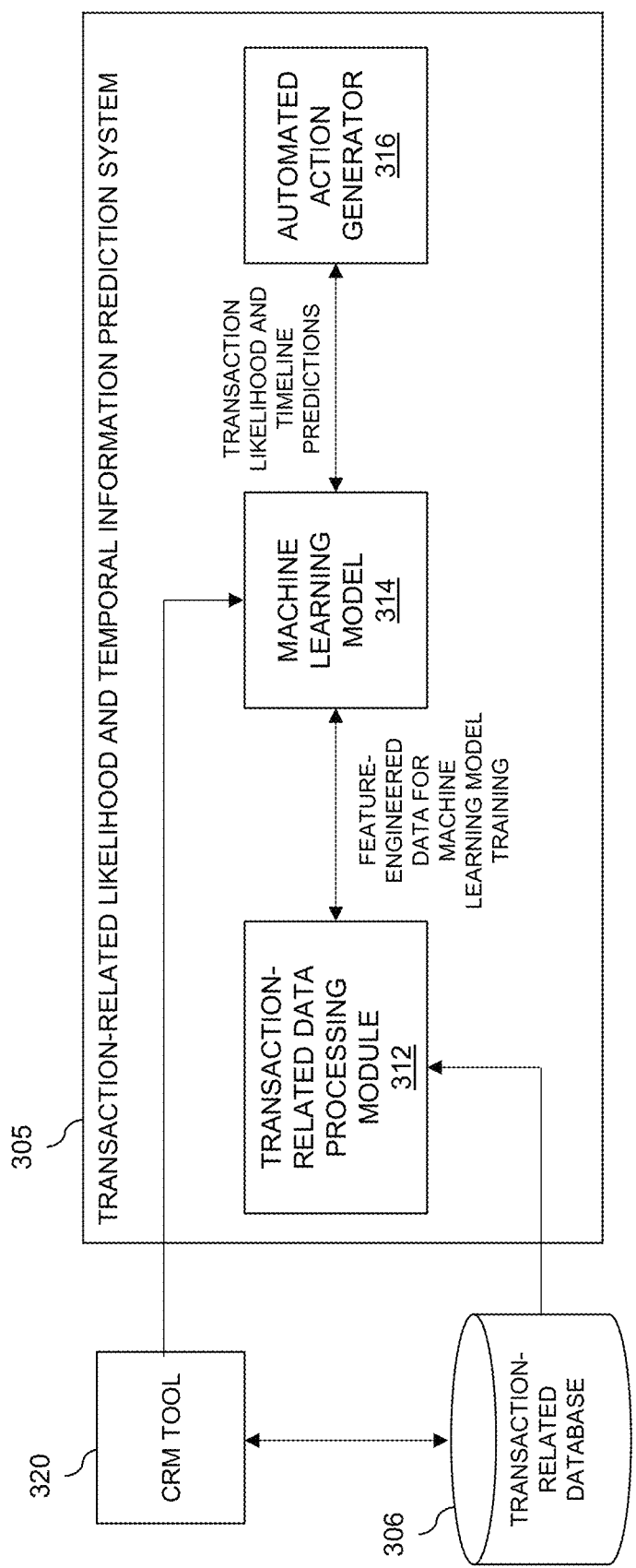
FIG. 3 shows an example workflow of at least a portion of an illustrative embodiment.

FIG. 3 shows an example workflow of at least a portion of an illustrative embodiment. By way of illustration, FIG. 3 depicts data pertaining to a transaction and/or deal (comprising, for example, one or more opportunities) flowing from CRM tool 320 to transaction-related database 306 (e.g., a structured query language (SQL) database). In one or more embodiments, transaction-related likelihood and temporal information prediction system 305, specifically transaction-related data processing module 312, obtains raw data from database 306 and performs one or more feature engineering techniques (e.g., determining and/or calculating at least a portion of the features detailed above and herein). In such an embodiment, at least a portion of the feature-engineered data is output by transaction-related data processing module 312 and used to train machine learning model 314. Additionally, in at least one embodiment, various optimizations and algorithmic tuning steps can be carried out during this training phase. Once satisfactory, the machine learning model is saved for further use in connection with prediction executions.

As noted above, optimization and algorithmic and/or parameter tuning can include tuning and testing different hyperparameters and evaluation metrics (also referred to herein as optimization metrics) for a classification algorithm (e.g., to increase the overall accuracy). In one or more embodiments, this includes, but is not limited to, modifying the structure of one or more decision trees used in a gradient boosting framework (e.g., tree-depth, number of iterations, etc.). Additionally, in such an embodiment, an evaluation/optimization metric such as Matthew's correlation coefficient can be used in connection with multi-class classification.

In connection with the machine learning model (and training the machine learning model) data and/or factors that can affect a transaction probability prediction and a transaction timeline prediction can include, for example, derived factors such as count of confidence interval changes in the past, count of changes in anticipated deal close date, deal close data variability and/or patterns by week, month, etc., historical performance measure of relevant sales representative(s) (e.g., deal conversion, prioritization score, etc.), recency information for at least one relevant account, frequency information for at least one relevant account, monetary information for at least one relevant account, dwell time, close delta, journey weight, and/or one or more additional features based on deal journey. Such data and/or factors can also include, for example, direct factors (e.g., direct factors from a CRM tool) such as product line-level behavior, direct or channel sales route information, competitor information, type of solution (e.g., hardware refresh, storage solution, etc.), industry information, and revenue-related information.

Referring again to FIG. 3, one or more embodiments include providing data pertaining to a transaction and/or deal flowing directly from CRM tool 320 to machine learning model 314, wherein the trained machine learning model processes at least a portion of the input data and generates at least one transaction probability prediction and at least one temporal or timeline-based prediction associated with the transaction. Such predictions can be generated, for example, in one or more given formats and output to automated action generator 316, which can then initiate and/or carry out one or more automated actions based at least in part on the predictions. Such actions can include, for example, generating and outputting automated notifications to one or more supply chain-related systems and/or users, automatically taking one or more actions related to inventory management, automatically retraining the machine learning model using resulting data from transactions associated with the generated predictions (e.g., actual data for transactions associated with the generated predictions after such transactions have closed and/or been completed), etc.

FIG. 4 shows a table of base training examples for one complete transaction journey in an illustrative embodiment. Specifically, table 400 illustrates a journey partitioned into four different base training examples (and the synthetic features calculated in connection therewith), for each of the noted transitions. In one or more embodiments, each transition implicitly considers the entirety of the past journey until that juncture. Accordingly, and as noted above, table 400 represents one complete deal journey that included a confidence level sequence and/or progression that went from 30% to 10% to 60% to 90% to 100%.

Figure 5:
FIG. 5 shows a table of synthetic training examples derived from base training examples for an example transaction journey in an illustrative embodiment.

FIG. 5 shows a table 500 of synthetic training examples derived from base training examples for an example transaction journey in an illustrative embodiment. Specifically, table 500 illustrates numerous additional examples synthesized from base examples, and feature values corresponding thereto. For example, because the deal in question transitions from 30% (confidence of successful conversion to an order) to 10% and then 60% (that sequence representing two separate updates), FIG. 5 assumes and/or generates another example wherein the deal transition directly from 30% to 60% (ignoring the intermediary timestamps for the transition to 10%). Thereafter, additional examples are added to allow the machine learning model, for example, to learn stagnancy, wherein the base and current stage names are the same and the close delta value is zero. Such expansion of the training data allows the machine learning model to learn multiple possible transitions as well as the convergence to closure (win or loss) from any initial state.

In at least one embodiment, such additional training examples are generated using the base examples themselves. For example, in relation to the above-noted example that transitioned from 30% to 10% to 60% confidence levels, the base example set includes two line items, one for 30% to 10%, and another for 10% to 60%. As such, in an example embodiment, a synthetic/additional sample that could be derived from this journey is the direct transition from 30% to 60%, with feature calculations such as dwell time, close delta, etc., solely depending on the timestamps for 30% and 60% (i.e., as if there were no intermediary stage). Additionally, more examples can be generated for stagnancy, such as, for example, examples for the deal staying at 30%, and for the deal staying at 10%.

As also detailed herein, in one or more embodiments, the penalty factor (P) for each transition in a deal is to be calculated for the final journey weight. This can be described, in such an embodiment, via the following Boolean expression: $P = \bar{y} \cdot (\bar{x} + x \cdot \bar{z})$, wherein the penalty factor (P) is a Boolean value calculated for each transition to determine if that transition needs to be penalized. In such an expression, x, y and z represent Boolean variables referring to the polarity of a specific transition up to that point in the deal's lifetime (e.g., 1 pertains to a positive transition, and 0 pertains to a negative transition). For example, x can refer to the polarity of a preceding (e.g., $(n-1)^{th}$) transition, y can refer to the polarity of the current (e.g., $n^{th}$) transition), and z can refer to the polarity of a succeeding (e.g., $(n+1)^{th}$) transition.

Figure 6:
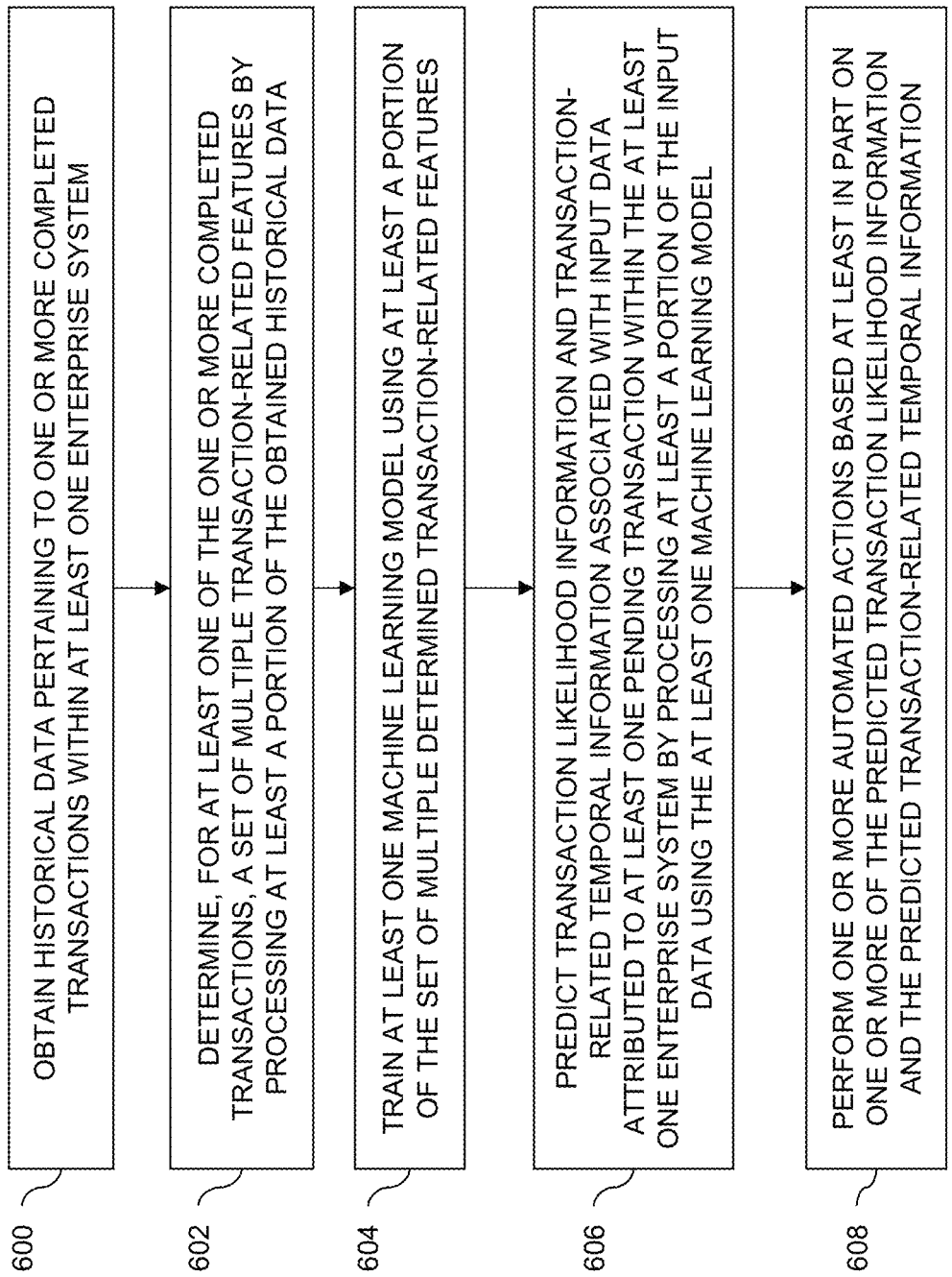
FIG. 6 is a flow diagram of a process for automatically predicting transaction likelihood information and transaction-related temporal information using machine learning techniques in an illustrative embodiment.

FIG. 6 is a flow diagram of a process for automatically predicting transaction likelihood information and transaction-related temporal information using machine learning techniques in an illustrative embodiment. It is to be understood that this particular process is only an example, and additional or alternative processes can be carried out in other embodiments.

In this embodiment, the process includes steps 600 through 608. These steps are assumed to be performed by the transaction-related likelihood and temporal information prediction system 105 utilizing its elements 112, 114 and 116.

Step 600 includes obtaining historical data pertaining to one or more completed transactions within at least one enterprise system. In at least one embodiment, obtaining historical data pertaining to one or more completed transactions includes obtaining historical data pertaining to at least one of one or more transactions that converted to one or more orders and one or more cancelled transactions.

Step 602 includes determining, for at least one of the one or more completed transactions, a set of multiple transaction-related features by processing at least a portion of the obtained historical data. In one or more embodiments, determining the set of multiple transaction-related features includes determining a time duration between two or more updates to the status of the at least one completed transaction and/or determining a time gap between a first estimated date for closing the at least one completed transaction and a second estimated date for closing the at least one completed transaction. Additionally or alternatively, determining the set of multiple transaction-related features can include determining a journey weight for the at least one completed transaction, wherein the journey weight is based at least in part on polarity of each successive status change of the at least one completed transaction, squares of successive confidence value differences for the at least one completed transaction, and a penalty factor related to one or more types of transitions during transaction pendency. Also, in such an embodiment, the journey weight can be defined as a Boolean algebraic equation.

Step 604 includes training at least one machine learning model using at least a portion of the set of multiple determined transaction-related features. In at least one embodiment, training the at least one machine learning model includes processing at least a portion of the input data using at least one machine learning multi-class classifier algorithm and/or processing at least a portion of the input data using at least one machine learning-based tree-based gradient boosting framework.

Step 606 includes predicting transaction likelihood information and transaction-related temporal information associated with input data attributed to at least one pending transaction within the at least one enterprise system by processing at least a portion of the input data using the at least one machine learning model. In one or more embodiments, predicting the transaction likelihood information and the transaction-related temporal information includes predicting a likelihood that the at least one pending transaction is converted to at least one order within a designated period of time and/or predicting at least one confidence value associated with at least one given future temporal instance. Additionally or alternatively, predicting the transaction likelihood information can include predicting a sequence of confidence value changes during a journey associated with the at least one pending transaction. In such an embodiment, predicting the transaction-related temporal information includes predicting an amount of time between each of the confidence value changes in the predicted sequence.

Step 608 includes performing one or more automated actions based at least in part on one or more of the predicted transaction likelihood information and the predicted transaction-related temporal information. In at least one embodiment, performing the one or more automated actions includes further training the at least one machine learning model based at least in part on resulting data from at least one transaction associated with one or more of the predicted transaction likelihood information and the predicted transaction-related temporal information. Additionally or alternatively, performing the one or more automated actions can include outputting, based at least in part of one or more of the predicted transaction likelihood information and the predicted transaction-related temporal information, information pertaining to converting the transaction into an order and fulfilling the order to one or more entities associated with at least one supply chain system.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict transaction likelihood information and transaction-related temporal information using machine learning techniques. These and other embodiments can effectively overcome problems associated with incorrect demand views and forecast errors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
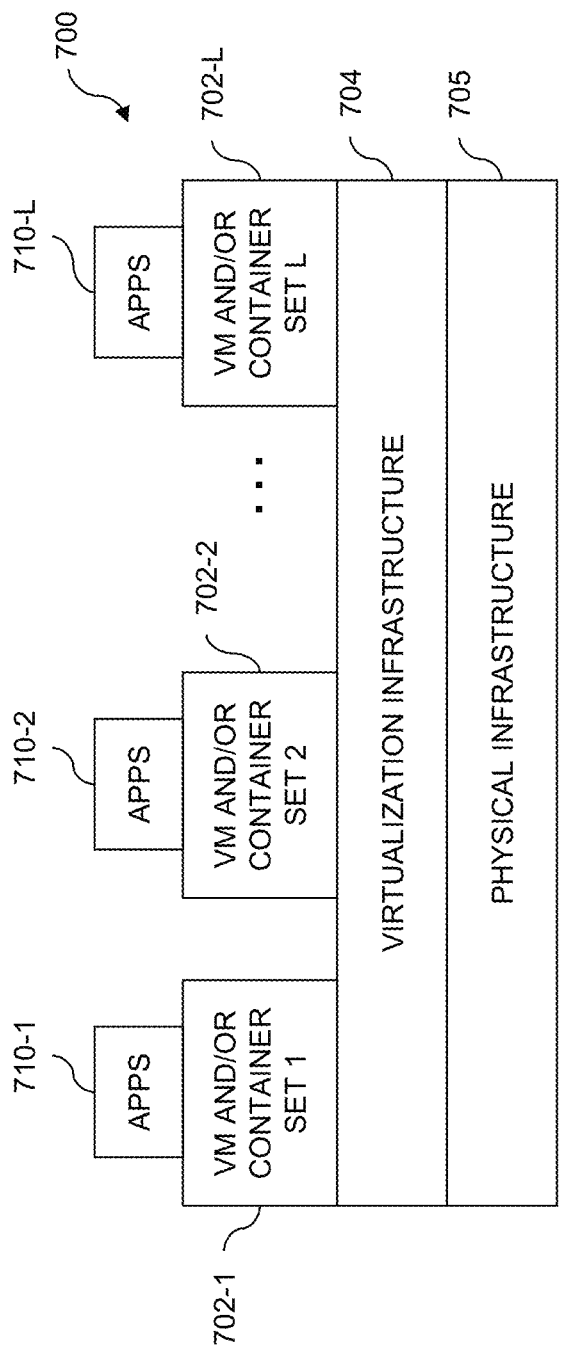
FIGS. 7 and 8 show examples of processing platforms that may be utilized to implement at least a portion of an information processing system in illustrative embodiments.
Figure 8:
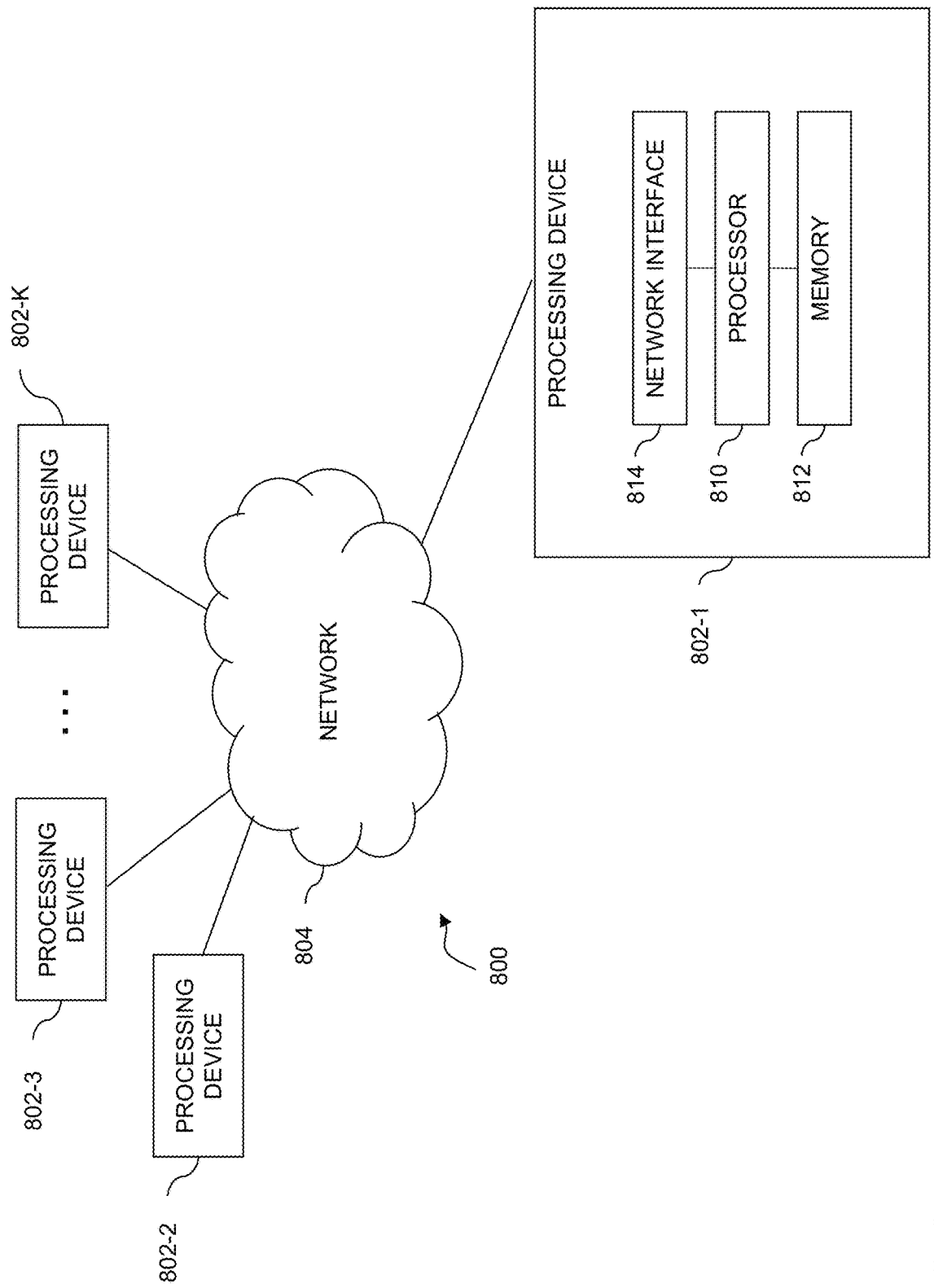

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining historical data pertaining to one or more completed transactions within at least one enterprise system;

determining, for at least one of the one or more completed transactions, a set of multiple transaction-related features by processing at least a portion of the obtained historical data;

training at least one machine learning model using at least a portion of the set of multiple determined transaction-related features;

predicting transaction likelihood information and transaction-related temporal information associated with input data attributed to at least one pending transaction within the at least one enterprise system by processing at least a portion of the input data using the at least one machine learning model, wherein predicting the transaction likelihood information and the transaction-related temporal information comprises predicting confidence values attributed to the at least one pending transaction based at least in part on respective status indicators representative of respective stages in at least one transaction-related process; and performing one or more automated actions based at least in part on one or more of the predicted transaction likelihood information and the predicted transaction-related temporal information;

wherein the method is performed by at least one processing device comprising a processor coupled to a memory.

2. The computer-implemented method of claim 1, wherein obtaining historical data pertaining to one or more completed transactions comprises obtaining historical data pertaining to at least one of one or more transactions that converted to one or more orders and one or more cancelled transactions.

3. The computer-implemented method of claim 1, wherein training the at least one machine learning model comprises processing at least a portion of the input data using at least one machine learning multi-class classifier algorithm.

4. The computer-implemented method of claim 1, wherein training the at least one machine learning model comprises processing at least a portion of the input data using at least one machine learning-based tree-based gradient boosting framework.

5. The computer-implemented method of claim 1, wherein performing the one or more automated actions comprises further training the at least one machine learning model based at least in part on resulting data from at least one transaction associated with one or more of the predicted transaction likelihood information and the predicted transaction-related temporal information.

6. The computer-implemented method of claim 1, wherein determining the set of multiple transaction-related features comprises determining a time duration between two or more updates to the status of the at least one completed transaction.

7. The computer-implemented method of claim 1, wherein determining the set of multiple transaction-related features comprises determining a time gap between a first estimated date for closing the at least one completed transaction and a second estimated date for closing the at least one completed transaction.

8. The computer-implemented method of claim 1, wherein determining the set of multiple transaction-related features comprises determining a journey weight for the at least one completed transaction, wherein the journey weight is based at least in part on polarity of each successive status change of the at least one completed transaction, squares of successive confidence value differences for the at least one completed transaction, and a penalty factor related to one or more types of transitions during transaction pendency.

9. The computer-implemented method of claim 8, wherein the journey weight is defined as a Boolean algebraic equation.

10. The computer-implemented method of claim 1, wherein predicting the transaction likelihood information comprises predicting a sequence of confidence value changes during a journey associated with the at least one pending transaction.

11. The computer-implemented method of claim 10, wherein predicting the transaction-related temporal information comprises predicting an amount of time between each of the confidence value changes in the predicted sequence.

12. The computer-implemented method of claim 1, wherein predicting the transaction likelihood information and the transaction-related temporal information comprises predicting a likelihood that the at least one pending transaction is converted to at least one order within a designated period of time.

13. The computer-implemented method of claim 1, wherein performing the one or more automated actions comprises outputting, based at least in part of one or more of the predicted transaction likelihood information and the predicted transaction-related temporal information, information pertaining to converting the transaction into an order and fulfilling the order to one or more entities associated with at least one supply chain system.

14. A non-transitory processor-readable storage medium having stored therein program code of one or more software programs, wherein the program code when executed by at least one processing device causes the at least one processing device:
to obtain historical data pertaining to one or more completed transactions within at least one enterprise system;
to determine, for at least one of the one or more completed transactions, a set of multiple transaction-related features by processing at least a portion of the obtained historical data;
to train at least one machine learning model using at least a portion of the set of multiple determined transaction-related features;
to predict transaction likelihood information and transaction-related temporal information associated with input data attributed to at least one pending transaction within the at least one enterprise system by processing at least a portion of the input data using the at least one machine learning model, wherein predicting the transaction likelihood information and the transaction-related temporal information comprises predicting confidence values attributed to the at least one pending transaction based at least in part on respective status indicators representative of respective stages in at least one transaction-related process; and
to perform one or more automated actions based at least in part on one or more of the predicted transaction likelihood information and the predicted transaction-related temporal information.

15. The non-transitory processor-readable storage medium of claim 14, wherein training the at least one machine learning model comprises processing at least a portion of the input data using at least one machine learning multi-class classifier algorithm.

16. The non-transitory processor-readable storage medium of claim 14, wherein training the at least one machine learning model comprises processing at least a portion of the input data using at least one machine learning-based tree-based gradient boosting framework.

17. An apparatus comprising:
at least one processing device comprising a processor coupled to a memory;
the at least one processing device being configured:
to obtain historical data pertaining to one or more completed transactions within at least one enterprise system;
to determine, for at least one of the one or more completed transactions, a set of multiple transaction-related features by processing at least a portion of the obtained historical data;
to train at least one machine learning model using at least a portion of the set of multiple determined transaction-related features;
to predict transaction likelihood information and transaction-related temporal information associated with input data attributed to at least one pending transaction within the at least one enterprise system by processing at least a portion of the input data using the at least one machine learning model, wherein predicting the transaction likelihood information and the transaction-related temporal information comprises predicting confidence values attributed to the at least one pending transaction based at least in part on respective status indicators representative of respective stages in at least one transaction-related process; and to perform one or more automated actions based at least in part on one or more of the predicted transaction likelihood information and the predicted transaction-related temporal information.

18. The apparatus of claim 17, wherein training the at least one machine learning model comprises processing at least a portion of the input data using at least one machine learning multi-class classifier algorithm.

19. The apparatus of claim 17, wherein training the at least one machine learning model comprises processing at least a portion of the input data using at least one machine learning-based tree-based gradient boosting framework.

20. The apparatus of claim 17, wherein performing the one or more automated actions comprises further training the at least one machine learning model based at least in part on resulting data from at least one transaction associated with one or more of the predicted transaction likelihood information and the predicted transaction-related temporal information.

* * * * *